(12) United States Patent
Balasaygun et al.

(10) Patent No.: US 8,594,297 B2
(45) Date of Patent: Nov. 26, 2013

(54) SYSTEM AND METHOD FOR ENHANCED CALL ROUTING

(75) Inventors: Mehmet Balasaygun, Freehold, NJ (US); Rajeshwari Edamadaka, Allentown, NJ (US); Venkatesh Krishnaswamy, Holmdel, NJ (US)

(73) Assignee: Avaya Inc., Basking Ridge, NJ (US)

( * ) Notice: Subject to any disclaimer, the term of this patent is extended or adjusted under 35 U.S.C. 154(b) by 55 days.

(21) Appl. No.: 13/337,467

(22) Filed: Dec. 27, 2011

(65) Prior Publication Data

US 2013/0163741 A1 Jun. 27, 2013

(51) Int. Cl.
*H04M 3/42* (2006.01)
(52) U.S. Cl.
USPC ................................. 379/211.01; 379/216.01
(58) Field of Classification Search
USPC ........................................ 379/211.01, 216.01
See application file for complete search history.

(56) References Cited

U.S. PATENT DOCUMENTS

2004/0208307 A1* 10/2004 Walker et al. ............. 379/265.01
2009/0041224 A1* 2/2009 Bychkov et al. .......... 379/216.01

* cited by examiner

*Primary Examiner* — Quynh Nguyen (57) ABSTRACT

Disclosed herein are systems, methods, and non-transitory computer-readable storage media for enhanced call routing. A system configured to practice the method determines the communicative intent of a caller based on the caller's identity, communication history, job title, and/or other factors. Based on this communicative intent, the system develops a list of most probable call destinations. From this list of most probable call destinations, the system selects the most-likely call destination the destination most likely to meet the needs of the caller based on the subject received. Then the system can initialize communications are then initialized between the user and the most-likely call destination.

20 Claims, 5 Drawing Sheets

SYSTEM AND METHOD FOR ENHANCED CALL ROUTING

BACKGROUND

1. Technical Field

The present disclosure relates to call routing and more specifically to determining caller intent based on an entered subject, and subsequently routing the caller to a call destination in a non-predetermined manner.

2. Introduction

With the number of telephone connections constantly increasing, correctly connecting to another party becomes increasingly convoluted and difficult. Previous solutions to this ever-present problem include area codes, phone books listing active connections for a geographic area, and automated directories. These solutions are sufficient for many situations, but fail when the caller lacks information about the specific individual with whom they need to communicate. In such situations, the most common solution is to seek human interaction, such as an operator or customer service representative. Classically, telephone users have been able to press '0' for operator assistance, with newer options evolving such as '411' performing similar, albeit different functions. For example, if someone needs a drugstore in an unfamiliar location, that person could dial '0' on a phone, converse with an operator, and be telephonically connected with a nearby drugstore. However, speaking with an operator is generally inefficient when compared to automated solutions.

The most common automated solution for when a caller lacks information about the specific individual with whom they need to communicate is an automated call tree, where users are presented a specific outline of selectable options, which lead to more options, and eventually to the sought after connection. For example, if a caller needs to speak with someone concerning a recently received invoice but does not know the identity of the individual who handles invoicing, that caller could call the company's automated call system. Within this system, the caller can make a choice for 'Accounting', followed by a choice for 'Billing', after which the caller will be connected to the correct individual for their particular issue. This process, like the process of communicating with a live operator, can be time consuming and inefficient, relying upon correct classification of the parties involved and a correct understanding of the caller's needs. In addition, call trees require users to follow predictable, pre-defined route paths, which can be frustrating in scenarios where the user is unfamiliar with the specific language and structure used within the call tree.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for enhanced call routing. More specifically, a system configured to practice the method can enhance call routing by determining the intent of the caller using the caller's identity, communication history, job title, and other factors. Based on this derived intent, the caller is placed in communication with the person most likely to meet the needs of the caller.

The system can receive information associated with a user identifier. Based on this user identifier, the system generates pre-call weights, which reflect pre-determined likelihoods for future occurrences. Upon receiving a subject associated with an intent to communicate from the user, the system analyzes the subject using the pre-call weights to yield a list of ranked probable call destinations. From that list, the system can select the most-likely call destination and initialize communication with that individual on behalf of the user.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for improved call routing. A system, method and non-transitory computer-readable media are disclosed which enhance call routing based in part on the subject matter of a communicative intent. A brief introductory description of a basic general purpose system or computing device in FIG. 1 which can be employed to practice the concepts is disclosed herein. A more detailed description of enhanced call routing will then follow, as well as other variations and examples as the various embodiments are set forth. The disclosure now turns to FIG. 1.

Figure 1:
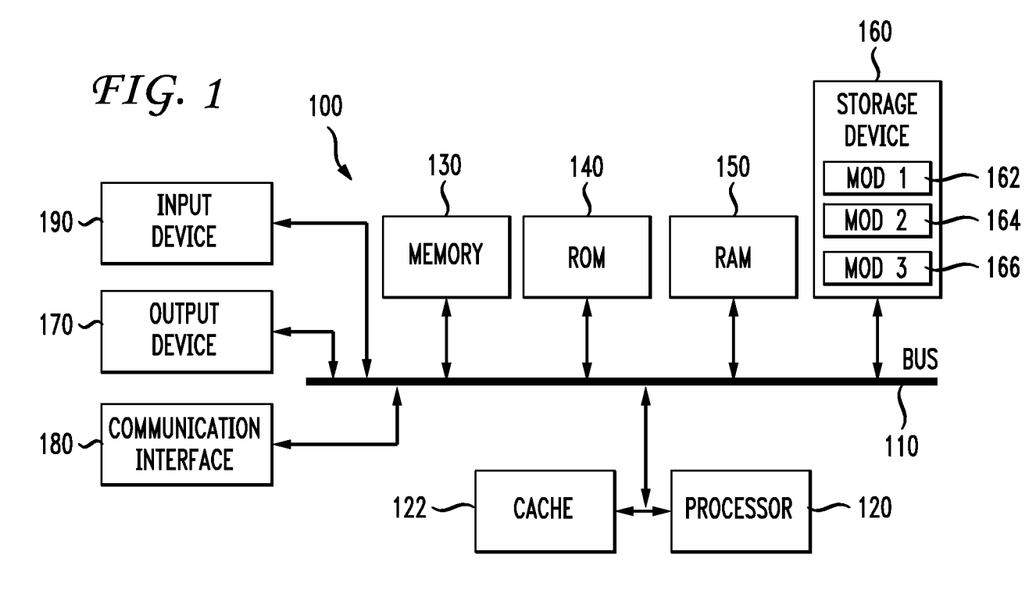
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
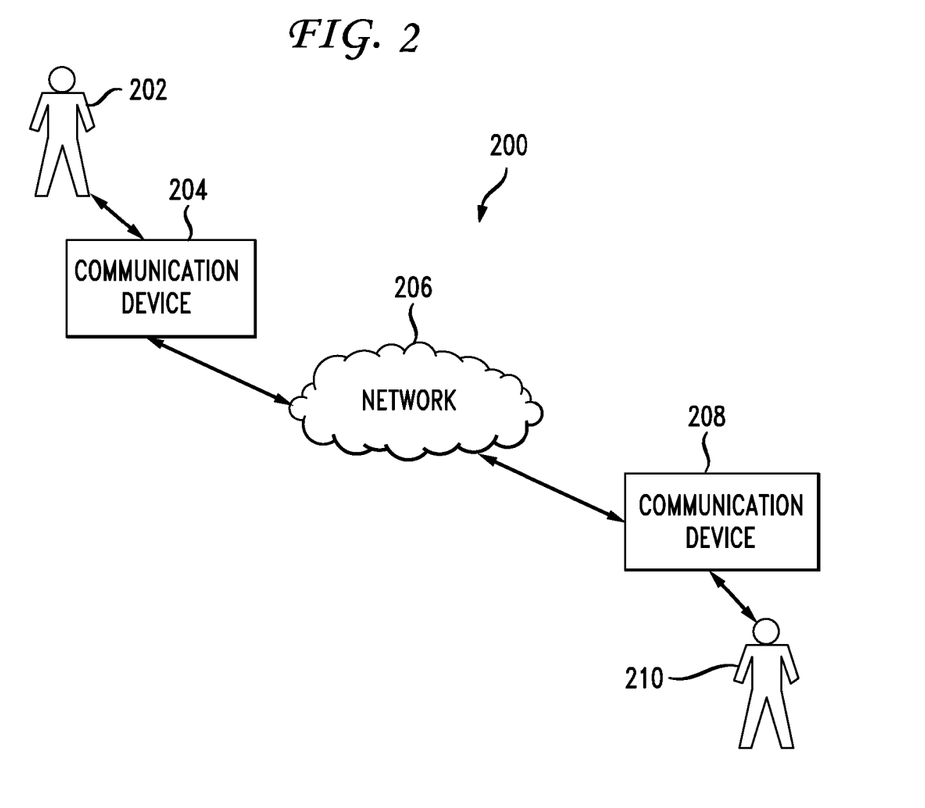
FIG. 2 illustrates a communication system.

Having disclosed some components of a computing system, the disclosure now turns to FIG. 2, which illustrates a communication system 200 with two people 202, 210 communicating over a network 206. These two people 202, 210 use communication systems 204, 208, such as phones, computers, cellphones, VOIP, video conferencing, instant messaging, and satellite terminals to communicate over the network 206. The most common network used with the disclosed system is the Internet, although other networks, such as internal networks (Intranets), telephone networks, wireless networks, wired networks, and satellite networks can also provide the connectivity required for ongoing communications. Any of these networks comply with the disclosed system for the network 206 within the communication system 200 shown.

Enhanced call routing as disclosed herein utilizes the subject of a communicative intent, the user identification of the caller, and other factors to determine the best match for that communicative intent. Systems configured to practice the method retrieve information such as user identity and factors such as job title, call history, and geographic location. These factors help the system to generate a pre-call weighting system which weighs probable call recipients based on their likelihood of receiving a call. When a user desires to communicate with someone, rather than proceeding through a phone tree or looking up a specific individual, the caller can enter the subject or subject matter on which they desire to communicate. The system applies the subject matter entered to the pre-call weights, creating a ranked list of probable call destinations. From the ranked list the system selects the most-likely call destination, at which point a call initiates between the caller and the most-likely call destination.

As an example of this enhanced call routing, consider John who works as an accounts payable specialist. John has logged into a system configured per this disclosure, and the system has retrieved John's call history, his job title, a list of preferred vendors, a list of current cases, as well as less directly relevant factors such as the current date and time. Using this information, the system prepares pre-call weights used to rank probable call recipients when a call subject when received. These pre-call weights can take the form of a matrix, a list related to specific factors, or any other manner of correlating the weights to probable call recipients.

John receives an invoice from the Acme corporation having an invoice number "8675309." John wishes to discuss this invoice with someone in billing with the Acme corporation, but is not sure with whom he needs to speak. Using the disclosed system, John enters a subject, which could be "Acme Billing" or the invoice number, "8675309." The system uses the pre-call weights to generate a list of potential call recipients. While "Acme Billing" may seem sufficiently explicit that John wishes to communicate with the billing department of Acme, the system adapts to the specific person and circumstances, as reflected in the pre-call weights. For Sam in engineering, perhaps entering a subject of "Acme Billing" initiates communications with John, who handles the in-house billing associated with Acme. In our case with John, the accounts payable specialist, the system uses John's job title of accounts payable specialist, the fact that he just received the invoice from Acme, and his call history to rank the billing department of Acme as the most-likely call destination in a list of probable call destinations. Based on this top ranking in the list of ranked probable call destinations, the system initiates communications between Acme's billing department and John.

Figure 3:
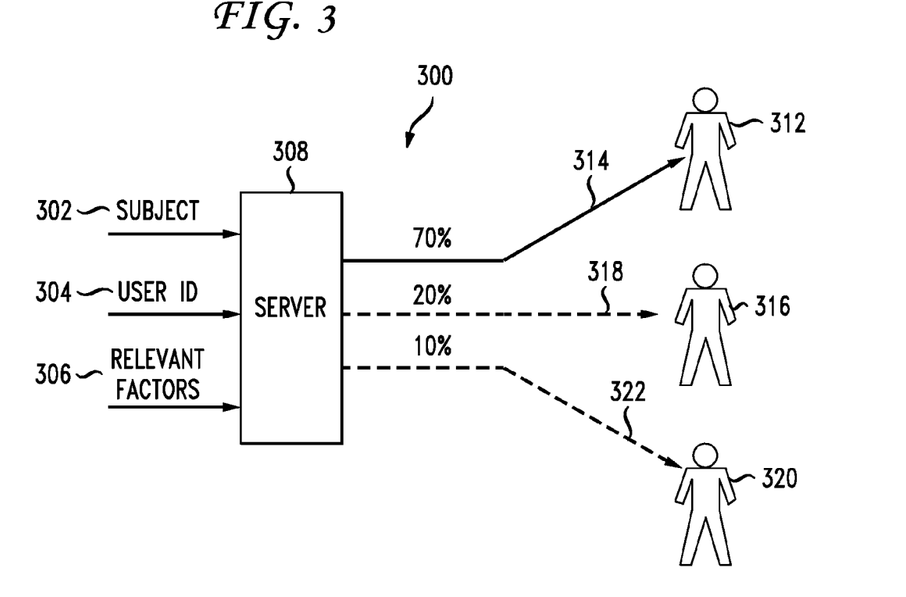
FIG. 3 illustrates communication selection architecture.

FIG. 3 illustrates communication selection architecture 300. A user enters information to a system 308 configured according to this disclosure. This information can include a subject 302, a user identity 304, as well as other relevant factors 306. Among potential relevant factors: the user's job title, the current date and time, recent and comprehensive communication history, previous call routing effectiveness, and availability of potential contacts. In another scenario, the additional relevant factors can include a list of current projects, a preferred contacts list, geographic locations of the potential contacts, subject matter expertise, and urgency. In a scenario where an individual Ben wanted to contact Tim, but could not remember Tim's last name, the first and last names of potential contacts would be relevant factors 306 and entered into the system 308. Ben could then enter "Tim" as the subject 302. Relevant factors can also include a search history, trending topics, and geographic suggestions. The user can explicitly provide these factors, or the system can automatically pull them from data sources associated with the user. In an instance where the user has previously rated call routing effectiveness, the additional factors can include the previous call routing ratings to develop weights molded to the specific tastes of the user or the current circumstances.

Upon receiving the sought after information 302, 304, 306, the system 308 prepares a list of probable call destinations 312, 316, 320. Each of these probable call destinations 312, 316, 320 receives a score or other ranking The system determines these scores without the use of a predictable, pre-defined route path or call tree, and can partially base the scores using feedback from previous call routing. In this illustration, the system 308 predicts that probable call recipient 312 has a 70% 314 likelihood of being the correct probable call recipient given the subject, the user identity, and the relevant factors, while probable call recipients 316 and 320 have 20% 318 and 10% 322 likelihood of being the intended call recipients, respectively. Therefore, as illustrated, probable call recipient 312 is the most likely call destination. Depending on how the system 308 is configured, the system 308 can immediately connect a call from the user to the most likely call destination 312, or alternatively, can provide a few top ranked options to the user to aid the user in selecting the call destination desired. If the system immediately connects the call, no further action is required from the user to establish communications with the most likely call recipient, although a notification of who or where is being called can occur.

If the system presents a list of top ranked options to the user, the user will be required to decide with whom to initiate communications from the best options presented through a user interface. For example, on a smartphone, after entering the user's identity and a subject of "Pizza", a list of nearby pizza locations could appear on the phone, with a listing of contact information. However, because of the user's identity, the system restricts this list to "Vegan Friendly" pizza locations. The user can scroll through these, select the one preferred, and call, text, or otherwise communicate with the selected communication recipient. If the interface is not a smartphone, but is instead a speech-only interface, the system can audibly present each option of the top ranked options to the user. The user can then respond via a voice command, such as "I want that one" or "The first option."

In certain scenarios, the system may lack sufficient information to enable ranking top probabilities. In this situation, the system can prompt the user for further input. This prompting can utilize any available output mechanism, such as a visual prompting via a monitor, or an audible prompting via a telephone speaker. The input mechanism can be a keyboard, keypad, microphone, or other available input devices. The future input requested can depend on previous input, or can begin anew. Upon receiving this further input from a user, the system can complete a connection, request even more additional input, and store the received information for use in determining future weights and future rankings.

Figure 4:
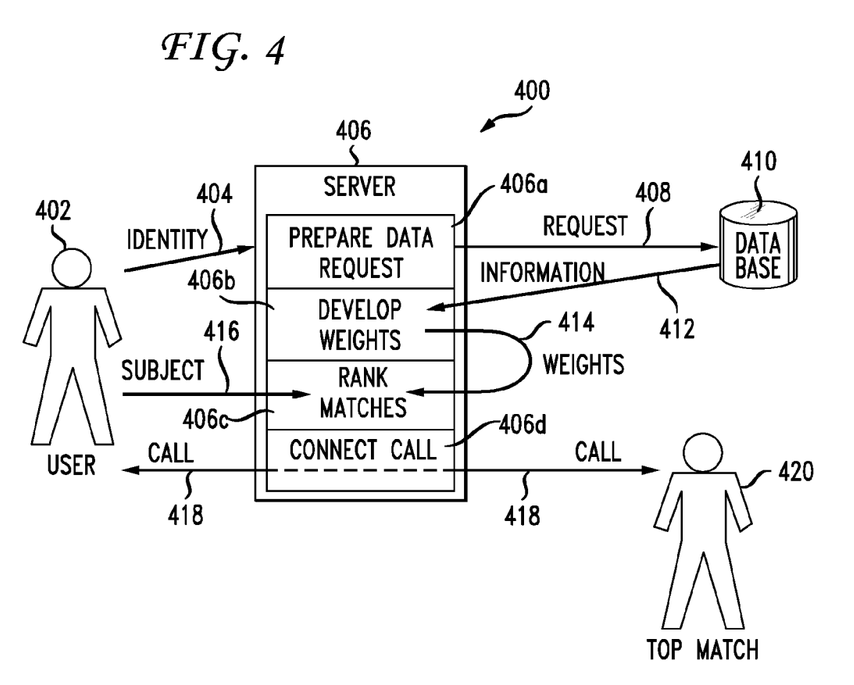
FIG. 4 illustrates a flow of information architecture.

FIG. 4 illustrates the flow of information architecture 400 for a system configured according to the disclosed method. A user 402 first submits information to a server 406 or other computing device configured according to this disclosure. The information submitted will generally include the user's identity 404, however in certain situations the identity of the user is irrelevant. For example, if a system 406 is deployed at a warehouse accessible by multiple workers at any given time, the individual identity of the workers is unlikely to make a significant difference in probable call destinations or pre-call weighting. In such a scenario, a single, collective job title of "Warehouse Specialist" can be sufficient.

Having obtained the identity 404 and any other information, the server prepares a data request 406a. Within this module, or step, the server 406 analyzes the information received and based on that information prepares a request 408 to a database 410. For example, if the information received is a user identity 404, the request 408 can be for data directly associated with that user's job title, the user's communication history, the communication history of other users with the same job title, a list of that user's current projects, a list of current vendors or customers, a listing of potential clients, a list of blocked or discouraged contacts, geographic preferences, scheduling or calendar information, and any other information useful in determining probable communication contacts. The database 410 can be one or more sources. In some cases, the database 410 can be a set of telephone directories, whereas in other instances the database 410 can be a single search engine, a repository of emails, or a collection of music. The system 406 can access multiple databases 410 using a single request 408 transmitted to multiple databases 410, or can prepare individual requests for each database 410 depending upon the nature of the information sought after in each database 410.

The database 410 responds to the request 408 by sending to the server 406 any information 412 available. The server 406 uses this information 412 within a module or step to develop weights 406*b*. These weights reflect the probabilities that any probable contact will be the intended call recipient of the user 402. In certain embodiments, these pre-call weights take the form of a list of values associated with each probable contact, whereas in other embodiments the pre-call weights take the form of a lattice or matrix dependent upon multiple factors. For example, if the pre-call weights form a lattice, a relative weight of 3 can be given to the likelihood that a contact is the intended communication recipient at 11 AM, whereas at 4 PM that same contact can have a relative weight of 7.

Once developed, the weights 414 await input of a subject 416 from the user 402 or another form of input. This subject 416 is related to the person with whom the user wishes to communicate, although the detail of the subject 416 can vary. For instance, in some cases the user can enter a short subject, such as "HR", which could be interpreted as "Human Resources", at which point the system can initiate communications with the Human Resources department, or perhaps a specific individual within Human Resources, depending upon the pre-call weights. In other cases, the subject received can be longer and more difficult to analyze. For instance, if a user entered "HR concerning raises and John Smith's recent performance evaluation" the system can still initialize communications with Human Resources, but perhaps a specific individual who records information about performance evaluations, and if sufficient detail can be located in the database 410, the individual over John Smith's performance evaluation.

Entering the subject 416 can be performed in a multitude of acceptable manners. A common manner for entering the subject is via a keyboard or text interface, which interfaces with the server 406. Another manner for entering the subject is via a microphone. For instance, a user on a telephone could say, "Get me HR" which would be interpreted as the subject, at which point the weights 414 would be applied. Yet another way in which the subject could be entered is by highlighting on a computing device a keyword or series of keywords and clicking on a designated button to initiate communications based on the highlighted portion.

Having received the subject 416, the server 406 performs an analysis to rank probable communication matches 406*c*, combining the pre-call weights 414 and the received subject 416. This results in a ranked list, and highest ranked being the contact or probable communication recipient calculated to be the most likely person the user 402 wishes to speak with on the given subject using the factors previously received from the user 402 and the database 410. The server 406 then initializes communications 406*d* between the user 402 and the top match 420. As illustrated, this communication can use the server 406 as an intermediary, with calls 418 to each individual extended from the server 406. Alternatively, the server can initialize communications directly between the user 402 and the top match 420, with the server 406 removed as an intermediary. In other configurations, the server 406 can communicate with phones, video conferencing, or scheduling tools to direct that communications be initiated between the user 402 and the top match 410. The server 406 can automatically navigate a phone tree to arrive at the top match 410, and connect the user. Alternatively, the system can directly dial the top match, conference in the user, and then drop off, leaving the top match and the user to communicate. However, the system can also remain on the line and monitor the conversation to evaluate the effectiveness and accuracy of the top matches or to provide additional assistance, if requested, or the system detects communication difficulty. In certain configurations, the system automatically analyzes and ranks the effectiveness of the call, whereas in other configurations the user can provide feedback on the effectiveness of the call. The system can then use this feedback for developing future pre-call weights and future probable communication rankings. While FIG. 4 shows modules 406*a*, 406*b*, 406*c*, and 406*d* residing and operating within a single server, these components can be split and distributed among multiple physical and/or virtual computing devices.

Figure 5:
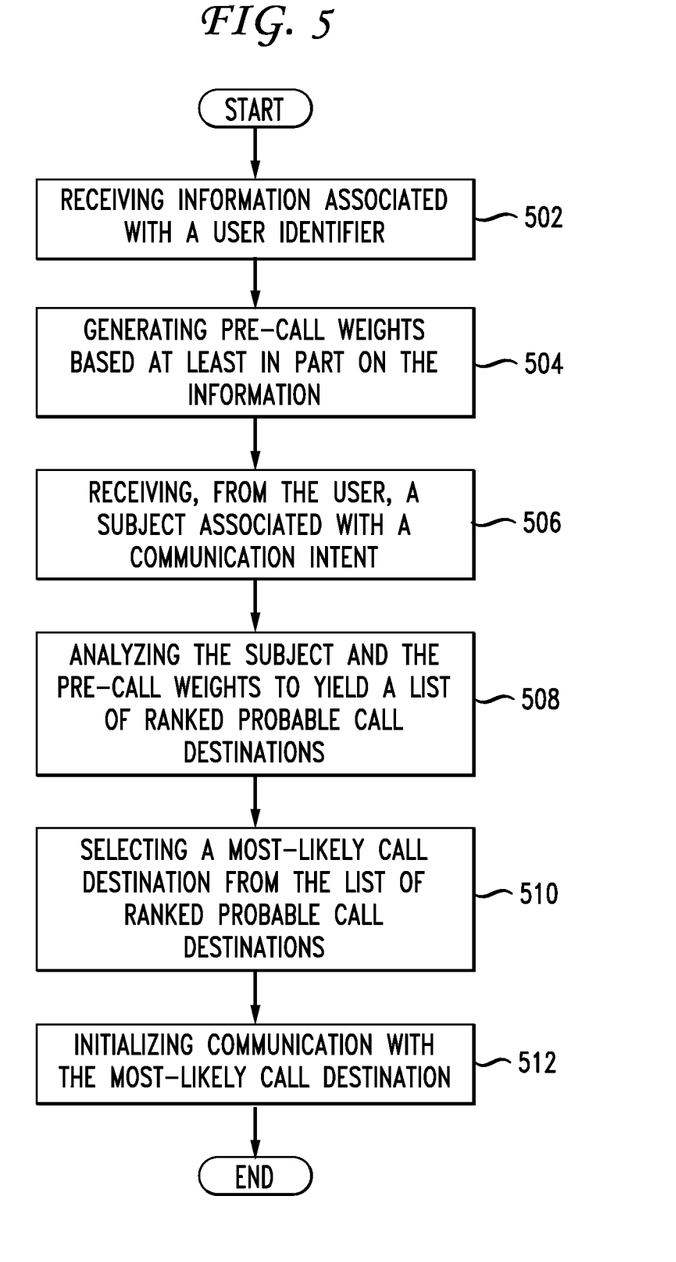
FIG. 5 illustrates an example method embodiment.

Having disclosed some basic system components and concepts, the disclosure now turns to the exemplary method embodiment shown in FIG. 5. For the sake of clarity, the method is discussed in terms of an exemplary system 100 as shown in FIG. 1 configured to practice the method. The steps outlined herein are exemplary and can be implemented in any combination thereof, including combinations that exclude, add, or modify certain steps.

The system 100 receives information associated with a user identifier (502). This information can be the actual identity of the user, or can be the job title of the user, a classification of the user, or other means for establishing a baseline understanding of who the user is. Other information associated with a user identifier can be a call history, a current projects list, and a preferred contacts list. Upon receiving the user identifier information, the system 100 generates pre-call weights based at least in part on the information (504). These pre-call weights reflect probabilities that the user will desire to communicate with a given probable call recipient. The call weights can be defined using a lattice or matrix, or can be defined using other means sufficient to calculate probability of future communications. For instance, the pre-call weights can depend on at least one of a time, a date, and a recently received communication. The system 100 then receives, from the user, a subject associated with a communication intent (506). That is, the user wishes to speak with someone about a given subject received by the system 100. The system can receive this subject through a user interface, such as a keyboard, touchscreen, or microphone. Alternatively, the system determines the subject based on contextual, situational information otherwise analyzed. The system then analyzes the subject and the pre-call weights to yield a list of ranked probable call destinations (508). The system 100 then selects a most-likely call destination from the list of ranked probable call destinations (510). In other instances, the system 100 presents to the user a list of the most-likely call destinations and receives a selection made by the user based on the presented list. The system then initializes communication with the most-likely call destination on behalf of the user (512). This communication can route through the system 100, or can be coordinated by the system 100 but operated independently. The format of the communication can vary, but telephone calls, conference calls, video conference, and an email are all acceptable formats.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply to subjects entered and determined via optical recognition systems tracking eye movement. Those skilled in the art will readily recognize various modifications and changes that may be made to the principles described herein without following the example embodiments and applications illustrated and described herein, and without departing from the spirit and scope of the disclosure.

We claim:

1. A method comprising:
   receiving information associated with a user identifier;
   generating, via a processor, pre-call weights based on the information;
   receiving, from a user, a subject associated with a communication intent;
   analyzing the subject and the pre-call weights to yield a list of ranked call destinations, the list being ranked according to a likelihood of the user calling each of the ranked call destinations;
   selecting a most-likely call destination from the list of ranked call destinations; and
   initializing a communication with the most-likely call destination.

2. The method of claim 1, wherein the pre-call weights comprise a lattice.

3. The method of claim 1, wherein the information is one of a job title, a call history, a current projects list, and a preferred contacts list.

4. The method of claim 1, wherein the communication comprises one of a telephone call, a conference call, a video conference, and an email.

5. The method of claim 1, wherein the subject is received via a microphone.

6. The method of claim 1, wherein selecting the most-likely call destination is based on a selection made by the user based on several top-ranked call destinations.

7. The method of claim 1, wherein the pre-call weights are dependent on one of a time, a date, user feedback, and a recently received communication.

8. A system comprising:
   a processor; and
   a computer-readable storage device storing instructions which, when executed by the processor, cause the processor to perform operations comprising:
   receiving information associated with a user identifier;
   generating pre-call weights based on the information;
   receiving, from a user, a subject associated with a communication intent;
   analyzing the subject and the pre-call weights to yield a list of ranked call destinations, the list being ranked according to a likelihood of the user calling each of the ranked call destinations;
   selecting a most-likely call destination from the list of ranked call destinations; and
   initializing a communication with the most-likely call destination.

9. The system of claim 8, wherein the pre-call weights comprise a lattice.

10. The system of claim 8, wherein the information comprises one of a job title, a call history, a current projects list, and a preferred contacts list.

11. The system of claim 8, wherein the communication comprises one of a telephone call, a conference call, a video conference, and an email.

12. The system of claim 8, wherein the subject is received via a microphone.

13. The system of claim 8, wherein selecting the most-likely call destination is based on a selection made by the user based on several top-ranked call destinations.

14. The system of claim 8, wherein the pre-call weights are dependent on one of a time, a date, and a recently received communication.

15. A computer-readable storage device storing instructions which, when executed by a processor, cause the processor to perform operations comprising:
   receiving information associated with a user identifier;
   generating pre-call weights based on the information;
   receiving, from a user, a subject associated with a communication intent;

analyzing the subject and the pre-call weights to yield a list of ranked call destinations, the list being ranked according to a likelihood of the user calling each of the ranked call destinations;

selecting a most-likely call destination from the list of ranked call destinations; and initializing communication with the most-likely call destination.

16. The computer-readable storage device of claim 15, wherein the pre-call weights comprise a lattice.

17. The computer-readable storage device of claim 15, wherein the information is one of a job title, a call history, a current projects list, and a preferred contacts list.

18. The computer-readable storage device of claim 15, wherein the communication comprises one of a telephone call, a conference call, a video conference, and an email.

19. The computer-readable storage device of claim 15, wherein the subject is received via a microphone.

20. The computer-readable storage device of claim 15, wherein the pre-call weights are dependent on one of a time, a date, user feedback, and a recently received communication.

\* \* \* \* \*